(12) United States Patent
Tsorng et al.

(10) Patent No.: US 11,608,933 B2
(45) Date of Patent: Mar. 21, 2023

(54) RETAINER ASSEMBLY FOR A STRUCTURE

(71) Applicant: Quanta Computer Inc., Taoyuan (TW)

(72) Inventors: Yaw-Tzorng Tsorng, Taoyuan (TW);
Ming-Lung Wang, Taoyuan (TW);
Hong-Yi Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 205 days.

(21) Appl. No.: 17/162,770

(22) Filed: Jan. 29, 2021

(65) Prior Publication Data
US 2022/0243867 A1 Aug. 4, 2022

(51) Int. Cl.
*F16M 13/02* (2006.01)
*F16M 11/10* (2006.01)
*H01Q 1/12* (2006.01)

(52) U.S. Cl.
CPC ............ *F16M 11/10* (2013.01); *F16M 13/02* (2013.01); *H01Q 1/125* (2013.01); *H01Q 1/1228* (2013.01)

(58) Field of Classification Search
CPC ...... H01Q 1/125; H01Q 1/1228; F16M 11/10; F16M 13/02; F16M 11/18
See application file for complete search history.

(56) References Cited

U.S. PATENT DOCUMENTS

| | | | | |
|---|---|---|---|---|
| 6,535,177 | B1* | 3/2003 | Dhellemmes | H01Q 5/45 343/765 |
| 7,408,526 | B1* | 8/2008 | Pan | H01Q 1/125 343/882 |
| 7,866,616 | B2* | 1/2011 | Wen | H01Q 1/125 248/219.4 |
| 7,891,624 | B2* | 2/2011 | Dittmer | F16M 11/041 248/323 |
| 8,746,641 | B2* | 6/2014 | Fackler | F16M 11/10 343/882 |
| 8,907,862 | B2* | 12/2014 | Lettkeman | H01Q 1/125 343/878 |
| 10,340,579 | B2* | 7/2019 | Tsukada | H01Q 1/125 |
| 10,511,090 | B2* | 12/2019 | Clifford | H01Q 3/005 |
| 11,165,133 | B2* | 11/2021 | Lekselius | H01Q 3/06 |
| 2012/0211624 | A1* | 8/2012 | Lin | H01Q 1/125 248/292.14 |
| 2020/0321678 | A1* | 10/2020 | Renilson | H01Q 3/08 |
| 2021/0075083 | A1* | 3/2021 | Udagave | H01Q 1/1207 |
| 2021/0408661 | A1* | 12/2021 | Yoo | H01Q 1/125 |

* cited by examiner

*Primary Examiner* — Bradley Duckworth
(74) *Attorney, Agent, or Firm* — Nixon Peabody LLP

(57) ABSTRACT

A retainer assembly includes at least a front section, first and second sides, rack brackets, rack pins, a gear, a latch, and a user interface. The front section forms apertures. The rack brackets extend through a respective one of the apertures formed in the front section. The rack pins extend across the first side to the second side. The rack pins assist in coordinated movement of the rack brackets. The gear is located between and contacts the rack brackets. The gear is configured to laterally move the rack brackets. The latch is moveable from a first position to a second position to assist in preventing or inhibiting movement of the gear. The user interface is configured to move the gear.

20 Claims, 8 Drawing Sheets

RETAINER ASSEMBLY FOR A STRUCTURE

FIELD OF THE INVENTION

The present invention relates generally to a retainer assembly, and more specifically, to a retainer assembly that allows for easy angle adjustment of structures (e.g., outdoor electronic equipment) after installation.

BACKGROUND OF THE INVENTION

Common outdoor electronic equipment is usually fixed on a pole with a bracket. In one type of system, the brackets are fixed or installed on a pole by bolts and nuts. One problem with installing outdoor electronic equipment is the ability for adjusting or readjusting the angle of the electronic equipment. Some existing systems have the ability for adjustment. For example, one existing system includes multiple brackets that each need to be changed to the desired angle of the outdoor electronic equipment. This can be time consuming and can potentially result in errors in positioning the angle of the outdoor electronic equipment.

The present disclosure is directed to an improved retainer assembly that overcomes the above disadvantages of existing brackets and installation methods.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, a retainer assembly includes at least a front section, a first side and a second opposing side, a plurality of rack brackets, a plurality of rack pins, a gear, a latch, and a user interface. The front section forms a plurality of apertures. Each of the plurality of rack brackets extends through a respective one of the plurality of apertures formed in the front section. Each of the plurality of rack brackets has a first end. Each of the plurality of rack pins extends across the first side to the second opposing side. Each of the plurality of rack pins assists in coordinated movement of the plurality of rack brackets. The gear is located between and contacts two of the plurality of rack brackets. The gear is configured to laterally move two of the plurality of rack brackets. The latch is moveable from a first position to a second position to assist in preventing or inhibiting movement of the gear. The user interface is configured to move the gear.

According to a configuration of the above implementation, the retainer assembly further includes a plurality of device brackets. Each one of the plurality of device brackets is detachably secured to a respective one of the first ends of the plurality of rack brackets.

According to another configuration of the above implementation, the retainer assembly further includes an interior plate in which the gear is located between the first side and the interior plate. The interior plate forms a plurality of elongated slots. At least one of the plurality of rack pins extends through one of the plurality of elongated slots.

According to a further configuration of the above implementation, the retainer assembly further includes a plurality of interior plates. The plurality of interior plates is located between the first side and the second opposing side.

In a further aspect of the above implementation, the retainer assembly further includes at least one back section generally opposite of the front section. The at least one back section forms a plurality of apertures configured to assist in attaching the retainer assembly to a structure. The at least one back section of the retainer assembly is a plurality of back sections.

In a further aspect of the above implementation, each of the first side and the second side of the retainer assembly includes at least one elongated slot. The at least one elongated slot of each of the first side and the second side is configured to allow at least one of the plurality of rack pins to extend therethrough.

In yet a further aspect of the above implementation, the user interface of the retainer assembly is a rotating wheel with a knob for facilitating movement of the gear.

In another aspect of the above implementation, the shape of the plurality of rack brackets is a general U-shape.

According to a further aspect of the present disclosure, a retainer assembly and an electronic device combination is provided. The retainer assembly includes a first side and a second opposing side, a plurality of rack brackets, a plurality of rack pins, a gear, a latch, and a user interface. The front section forms a plurality of apertures. Each of the plurality of rack brackets extends through a respective one of the plurality of apertures formed in the front section. Each of the plurality of rack brackets has a first end. Each of the plurality of rack pins extends across the first side to the second opposing side. Each of the plurality of rack pins assists in coordinated movement of the plurality of rack brackets. The gear is located between and contacts two of the plurality of rack brackets. The gear is configured to laterally move two of the plurality of rack brackets. The latch is moveable from a first position to a second position for preventing or inhibiting movement of the gear. The user interface is configured to move the gear. Each one of the plurality of device brackets is detachably secured to a respective one of the plurality of the first ends of the plurality of rack brackets. The electronic device is secured to the retainer assembly via the plurality of device brackets.

According to a configuration of the above implementation, the angle of the electronic device relative to the retainer assembly is from about a positive 45 degrees to about a negative 45 degrees. It is contemplated that the angle of the electronic device relative to the retainer assembly is from about a positive 25 degrees to about a negative 25 degrees, or from about a positive 15 degrees to about a negative 15 degrees.

According to another configuration of the above implementation, the retainer assembly further includes a plurality of interior plates. The plurality of interior plates is located between the first side and the second opposing side.

According to a further configuration of the above implementation, the retainer assembly further includes at least one back section generally opposite of the front section. The at least one back section forms a plurality of apertures configured to assist in attaching the retainer assembly to a structure.

In a further aspect of the above implementation, the user interface is a rotating wheel with a knob for facilitating movement of the gear.

According to one method, a retaining assembly and a component are assembled and secured to a structure. The retainer assembly is provided, and includes at least a front section, a first side and a second opposing side, a plurality of rack brackets, a plurality of rack pins, a gear, a latch, and a user interface. The front section forms a plurality of apertures. Each of the plurality of rack brackets extends through a respective one of the plurality of apertures formed in the front section. Each of the plurality of rack brackets has a first end. Each of the plurality of rack pins extends across the first side to the second opposing side. Each of the plurality of rack pins assists in coordinated movement of the plurality of rack brackets. The gear is located between and contacts two of the plurality of rack brackets. The gear is configured to laterally move two of the plurality of rack brackets. The latch is moveable from a first position to a second position to assist in preventing or inhibiting movement of the gear. The user interface is configured to move the gear. The component is provided with a plurality of device brackets secured thereto. The component is secured to the retainer assembly via the plurality of device brackets. The component is adjusted to a desired angle relative to the retainer assembly.

In a further aspect of the above method, the retainer assembly is retained to the structure by securing at least one cable tie through a plurality of apertures formed in the retainer assembly and around the structure.

In a further aspect of the above method, the component is an electronic device.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

Figure 1:
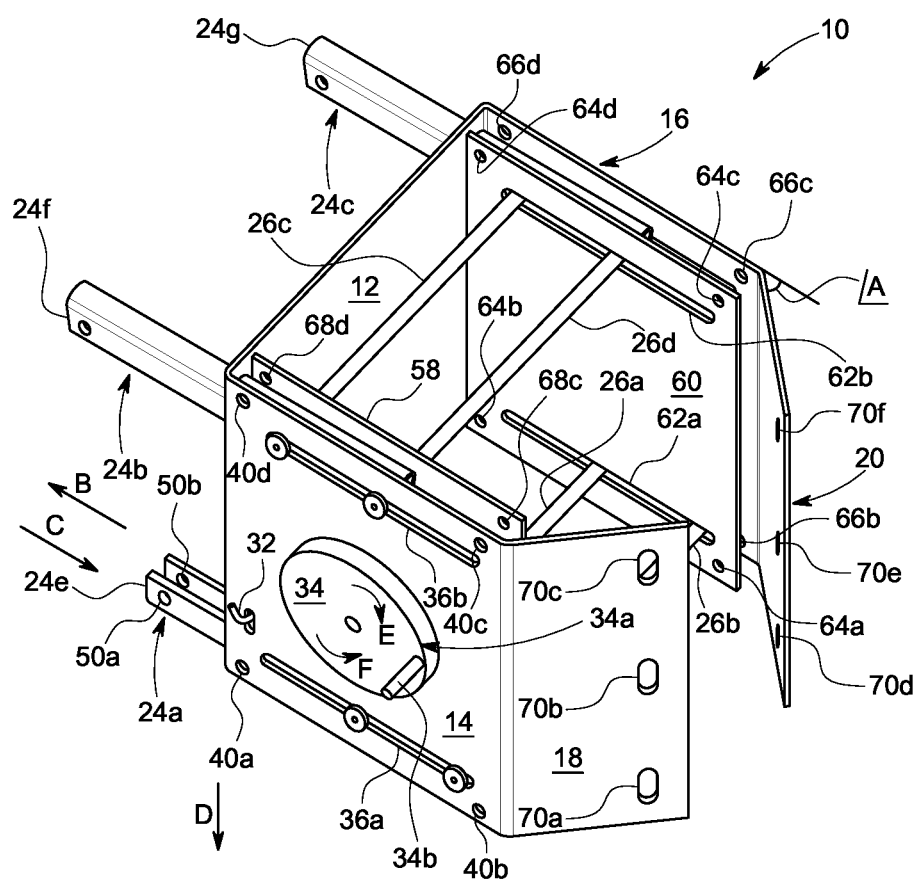
FIG. 1 is a top perspective view of a retainer assembly, in accordance with one embodiment of the present disclosure.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 2:
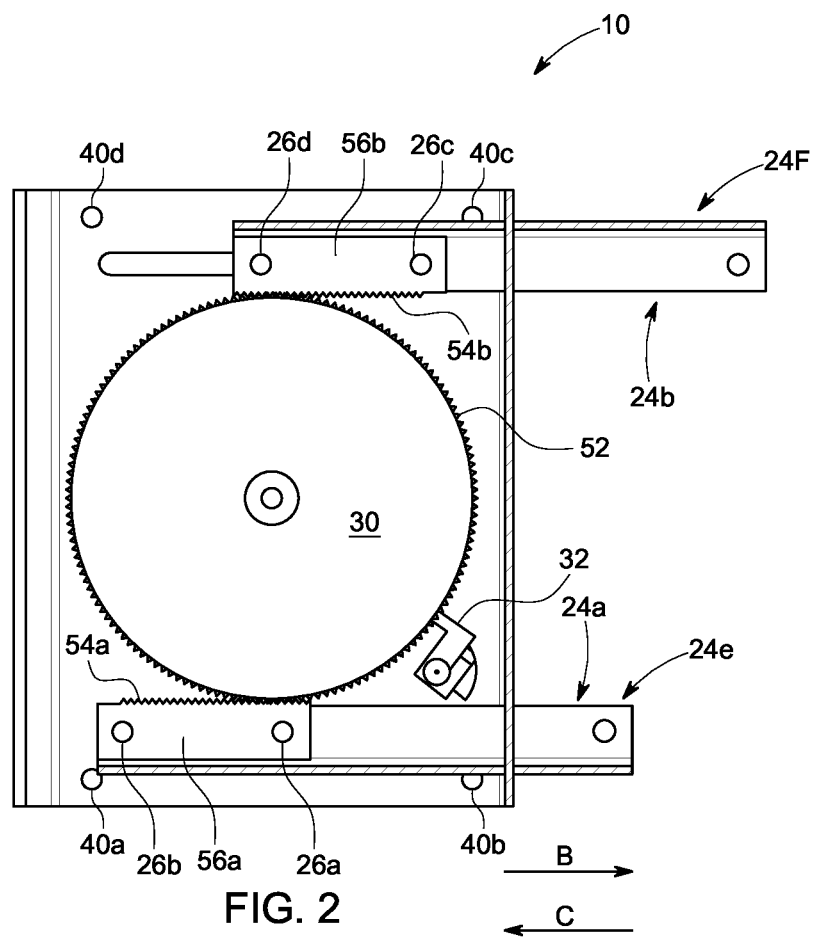
FIG. 2 is an interior view of the retainer assembly of FIG. 1 after removing a second side and a portion of the interior components therein.

FIGS. 1 and 2 illustrate a retainer assembly 10 that is configured to retain and secure components. Non-limiting examples of components that may be retained and secured include electronic devices. The electronic devices may be communication equipment. Some non-limiting examples of electronic devices that may be used include, but are not limited to, antennas, AAU (Active Antenna Unit), RRU (Remote Radio Unit), or DU (Distributed Unit). Typically, these components are located in an outdoor environment. The retainer assembly may be used in other locations such as in indoor locations.

The retainer assembly of the present invention is easy for a user to mount and install, as well as service, if needed. The retainer assembly is advantageous in the ability to easily adjust the angle of the component (e.g., electronic device) relative to the retainer assembly. The retainer assembly is designed to reduce the time for installing the component (e.g., electronic device) in the air. The present invention is also advantageous in that it may be assembled in the absence of tools in one method.

The retainer assemblies of the present invention are adapted to be mounted and secured to a structure such as, for example, a pole. It is contemplated that the retainer assemblies may be secured to other structures such as a pylon or a derrick.

Figure 3:
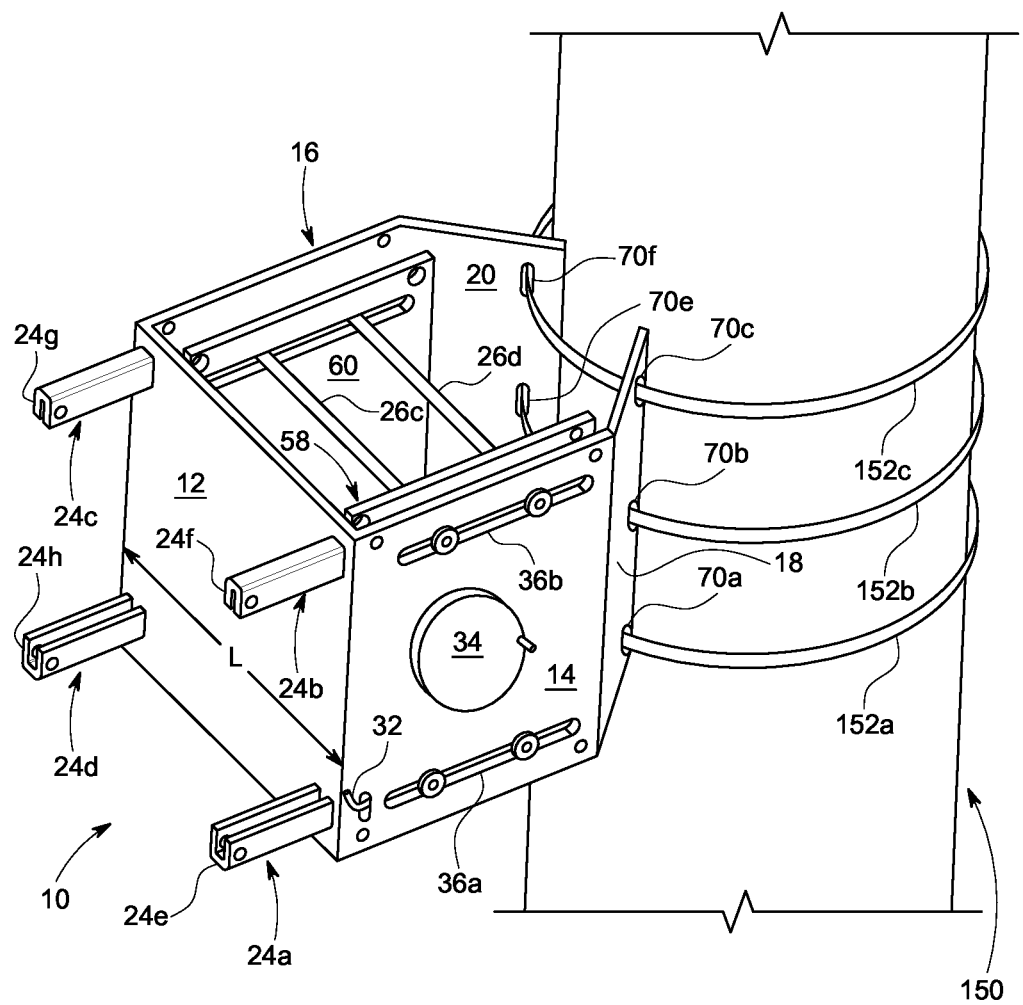
FIG. 3 is a top perspective view of the retainer assembly of FIG. 1 attached to a structure, in accordance with one embodiment of the present disclosure.

FIG. 1 illustrates the retainer assembly 10 in an assembled top perspective view, and FIG. 2 shows an interior view of selected components in the retainer assembly of FIG. 1. FIG. 3 illustrates the retainer assembly 10 attached to a structure 150. Referring specifically to FIG. 1, the retainer assembly 10 includes a front section 12, a first side 14, a second opposing side 16, and a plurality of back sections 18, 20. Referring to FIGS. 1-3, the retainer assembly 10 further includes a plurality of rack brackets 24a-24d, a plurality of rack pins 26a-26d extending across the first side 14 to the second opposing side 16, a gear 30 (FIG. 2 only), a latch 32, and a user interface 34.

Referring specifically to FIG. 1, the first side 14 forms a plurality of elongated slots 36a, 36b. The second opposing side 16 forms identical elongated slots as the elongated slots 36a 36b of FIG. 1. The second opposing side 16 includes the same features as the first side 14, except without the latch 32 and the user interface 34. Each of the elongated slots is configured to allow a plurality of rack pins to extend therethrough. It is contemplated that the first and second sides may form at least one elongated slot in which at least one rack pin extends therethrough.

Referring still to FIG. 1, the back sections 18, 20 are located generally opposite from the front section 12. The front section 12 forms a plurality of apertures in which each is configured to receive a respective one of the plurality of rack brackets 24a-24d. The plurality of apertures formed in the front section is shaped and sized to allow a rack bracket to extend therethrough. The plurality of apertures in one embodiment is in an elongated rectangular shape that corresponds to the cross-sectional U-shape of the rack brackets 24a-24d. It is contemplated that the apertures formed in the front section may be formed in other shapes and sizes.

The first and the second opposing sides 14, 16 of the retainer assembly 10 are shown as being generally perpendicular to the front section 12. It is contemplated that the first and second opposing sides may extend at an angle with respect to a front section of the retainer assembly. For example, the first and second opposing sides may flare outwardly or inwardly with respect to the front section.

Furthermore, the back sections 18, 20 extend inwardly from respective first and the second opposing sides 14, 16. As shown in FIG. 1, the back sections 18, 20 extend inwardly from the first side or second opposing side 14, 16 at an angle A of from about 20 to about 75 degrees, and more specifically from about 30 to about 60 degrees. The back sections 18, 20 are desirably angled when the structure (e.g., pole) is less than a certain diameter. For example, the back sections 18, 20 are angled in the embodiment where a length L (see FIG. 3) of the retainer assembly 10 is about 162 mm and the structure 150 has a diameter of 100 mm. It is contemplated that the back sections may extend generally perpendicular to the first and second opposing sides depending on the cross-sectional size of the structure. The back sections may form respective saw tooth edges in another embodiment to assist in securing the retainer assembly to the structure.

In one embodiment, the front section 12, the first and second opposing sides 14, 16, and the plurality of back sections 18, 20 of the retainer assembly 10 are integrally formed with each other. It is contemplated that the front section, the first and second opposing sides, and the plurality of back sections of the retainer assembly may be formed from separate components and secured together in another embodiment.

In another embodiment, it is contemplated that the back section may include exactly one back section. Thus, the retainer assembly includes at least one back section opposite of the front section.

In another embodiment, it is contemplated that the plurality of apertures configured to assist in attaching the retainer assembly to a structure may be located on the first and second opposing sides. This may the case when the retainer assembly is secured on larger structures (e.g., poles). It is also contemplated that the plurality of apertures configured to assist in attaching the retainer assembly to a structure may be located on one or more of the first and second opposing sides, and on one or more of the back sections of the bracket.

Referring to FIG. 3, each of the plurality of rack brackets 24a-24d extends through the front section 12. Each of the plurality of rack brackets has a respective first end 24e-24h. As will be discussed in detail below, the rack brackets 24a-24d in conjunction with device brackets assist in positioning the component at a proper angle relative to the retainer assembly 10, as will be discussed below.

The cross-sectional shape of the rack brackets 24a-24d of FIG. 3 has a cross-section in a general U-shape. It is contemplated that the rack brackets may be of a solid shape. It is also contemplated that other cross-sectional shapes may be used to form the rack brackets.

Each of the plurality of rack brackets forms at least one rack-pin aperture. In the retainer assembly 10, each of the rack brackets 24a-24d forms a plurality of paired rack-pin apertures. For example, rack pin 26c of FIG. 1 extends through a respective pair of apertures (not shown) formed in both of the rack brackets 24b, 24c. Similarly, the rack pin 26d of FIG. 1 extends through another respective pair of apertures (not shown) formed in both of the rack brackets 24b, 24c. The rack-pin apertures of the rack brackets 24a-24d are paired because of the cross-sectional U-shape of the rack brackets 24a-24d. If the rack brackets were solid, a single aperture would be formed entirely through the rack bracket. Each of the paired plurality of rack-pin apertures is configured, shaped and aligned to allow a different one of the plurality of rack pins 26a-26d to extend therethrough. The rack-pin apertures are typically of a similar or same shape as the cross-sectional shape of the rack pins.

The rack brackets at their respective first ends also form at least one aperture that assists in attaching each of the rack brackets to a respective device bracket. Because of the cross-sectional U-shape of the rack brackets, paired apertures are used to assist in attaching each of the rack brackets to a respective device bracket. For example, one of the paired apertures 50a, 50b is shown in FIG. 1 at the first end 24e of the rack bracket 24a. The other paired apertures of the other first ends 24f-24h of the rack brackets 24b-24d are of the same shape and size. It is contemplated that other paired apertures formed at the first ends of the rack brackets may be of different shapes and sizes.

Each of the plurality of rack pins 26a-26d extends across the first side 14 to the second opposing side 16. Each of the plurality of rack pins 26a-26d assists in coordinated movement of the plurality of rack brackets 24a-24d, as will be discussed below. The rack pins 26a-26d extend through the pair of apertures (not shown) formed in the rack brackets 24a-24d.

Referring to FIG. 2, the retainer assembly 10 includes the gear 30 being located between and contacting rack brackets 24a, 24b. The gear 30 is configured to laterally move the rack brackets 24a, 24b in the directions of arrows B and C in FIG. 2. The gear 30 includes a plurality of teeth 52 located around a periphery thereof. The plurality of teeth 52 rotatably engages teeth 54a, 54b to move the rack brackets 24a, 24b. In one embodiment, the teeth 54a, 54b are formed on respective racks 56a, 56b that are attached to respective second ends of the rack brackets 24a, 24b. Thus, the racks 56a, 56b are located opposite of the respective first ends 24e, 24f of the rack brackets 24a, 24b. In another embodiment, the teeth may be directly formed on two of the rack brackets.

To prevent or inhibit unintended movement of the gear 30, the latch 32 is included in the retainer assembly 10. The latch 32 is shown best in FIGS. 1 and 2. The latch 32 in a first position allows the gear 30 to rotate in both a clockwise and a counterclockwise direction. When a user moves the latch 32 to a second position, the gear 30 is prevented or inhibited from moving in either the clockwise or counterclockwise direction. In FIG. 2, the latch 32 is shown in the second position as engaging the gear 30, such that the gear 30 is prevented or inhibited from moving in either the clockwise or counterclockwise direction. A user may move the latch 32 back to a first position that is spaced apart from the gear 30, which allows the gear 30 to resume moving in a clockwise or counterclockwise direction. This is shown in FIG. 1 by moving the latch 32 in a generally downward direction (in the direction of arrow D).

Referring to FIG. 1, the user interface 34 assists in moving the gear 30 (shown in FIG. 2) in either a clockwise direction (arrow E) or a counterclockwise direction (arrow F). The user interface can be any implementation that assists a user in moving the gear. As shown in FIG. 1, the user interface 34 is a rotating wheel 34a with a knob 34b for facilitating movement of the gear 30. It is noted that the movement of the gear 30 by the user interface 34 is done when the latch 32 is not in its second position, which prevents or inhibits the gear 30 from moving in either a clockwise direction (arrow E) or a counterclockwise direction (arrow F).

The rotating wheel 34a is adapted to move in a rotational direction (arrows E and F in FIG. 1) to move the plurality of rack brackets 24a and 24b via the gear 30. As shown in FIGS. 1 and 2, when the rotating wheel 34a rotates in a counterclockwise direction (arrow F in FIG. 1), the rack bracket 24b extends outwardly from the remainder of the retainer assembly 10 (direction of arrow B in FIGS. 1 and 2). Similarly, the rack bracket 24c extends outwardly from the remainder of the retainer assembly 10 (direction of arrow B in FIGS. 1 and 2). When the rotating wheel 34a rotates in a counterclockwise direction (arrow F in FIG. 1), the rack bracket 24a retracts inwardly from the remainder of the retainer assembly 10 (direction of arrow C in FIGS. 1 and 2). Similarly, the bracket 24d retracts inwardly from the remainder of the retainer assembly 10 (direction of arrow C in FIGS. 1 and 2).

As shown in FIGS. 1 and 2, when the rotating wheel 34a rotates in a clockwise direction (arrow E in FIG. 1), the rack bracket 24a extends outwardly from the remainder of the retainer assembly 10 (direction of arrow C in FIGS. 1 and 2). Similarly, the rack bracket 24d extends outwardly from the remainder of the retainer assembly 10 (direction of arrow C in FIGS. 1 and 2). When the rotating wheel 34a rotates in a clockwise direction (arrow E in FIG. 1), the rack bracket 24b retracts inwardly from the remainder of the retainer assembly 10 (direction of arrow B in FIGS. 1 and 2). Similarly, the rack bracket 24c retracts inwardly from the remainder of the retainer assembly 10 (direction of arrow C in FIGS. 1 and 2).

It is contemplated that the user interface may be different than the shown wheel and knob. For example, in another embodiment, a handle could be used that is connected to the gear. The handle in this embodiment would assist in moving the gear in either a clockwise direction or a counterclockwise direction. The handle in one embodiment may be a generally flat platform with a looped handle being attached to opposing ends of the platform. The platform would be connected to the gear via, for example, a fastener. In another embodiment, the wheel may be removed such that a user can assess and move the gear in either a clockwise or counterclockwise direction using, for example, a wrench. It is contemplated that other user interfaces can be used in the present invention.

The retainer assembly in one embodiment may include at least one interior plate. For example, referring to FIG. 1, a plurality of interior plates 58, 60 is shown. The interior plates 58, 60 in conjunction with respective first and second sides 14, 16 assist in maintaining the lateral pathway of the rack brackets 24a-24d. In other words, the interior plates 58, 60 in conjunction with respective first and second sides 14, 16 limit or constrain the movement of the rack brackets 24a-24d such that each of the rack brackets 24a-24d remains spaced from the first and second sides 14, 16 at a desired distance.

The gear 30 (hidden in FIG. 1) is located between the interior plate 58 and the first side 14, and between the rack brackets 24a, 24b. Each of the interior plates 58, 60 in FIG. 1 forms a plurality of elongated slots. For example, the interior plate 60 forms elongated slots 62a, 62b that allow rack pins 26a-26d to slide therein. The interior plate 58 also forms elongated slots that allow rack pins 26a-26d to slide therein. The plurality of rack pins 26a-26d extends through one of the plurality of elongated slots in each of the interior plates 58, 60.

The interior plates 58, 60 are typically secured to respective first and second sides 14, 16. For example, the interior plates 58, 60 may be secured to the respective first and second sides 14, 16 by fasteners. In one embodiment, the interior plate 60 forms a plurality of apertures 64a-64d at its general corners. Each of the apertures 64a-64d corresponds with a respective one of the apertures formed in the second side 16. In FIG. 1, apertures 66b-66d are shown being formed in the general corners of the second side 16. Similarly, the first side 14 forms a plurality of apertures 40a-40d at its general corners. Each of the apertures 40a-40d corresponds with a respective one of the apertures formed in the general corners of the interior plate 58. In FIG. 1, apertures 68c, 68d are shown being formed in the general corners of the interior plate 58.

It is contemplated that the interior plates may be secured by other methods to the first and second sides. It is also contemplated that the interior plates may be secured in other manners and locations.

Referring to FIG. 1, the retainer assembly 10 further forms a plurality of apertures 70a-70f configured to assist in attaching the retainer assembly to a structure, as will be discussed below. Each of the plurality of apertures 70a-70f is located in one of the back sections 18, 20.

In another embodiment, it is contemplated that the plurality of apertures configured to assist in attaching the retainer assembly to a structure may be located on the first and second opposing sides. This may be the case when the retainer assembly is secured on larger structures (e.g., poles). It is also contemplated that the plurality of apertures configured to assist in attaching the retainer assembly to a structure may be located on one or more of the first and second opposing sides, and on one or more of the back sections of the retainer assembly.

Figure 4:
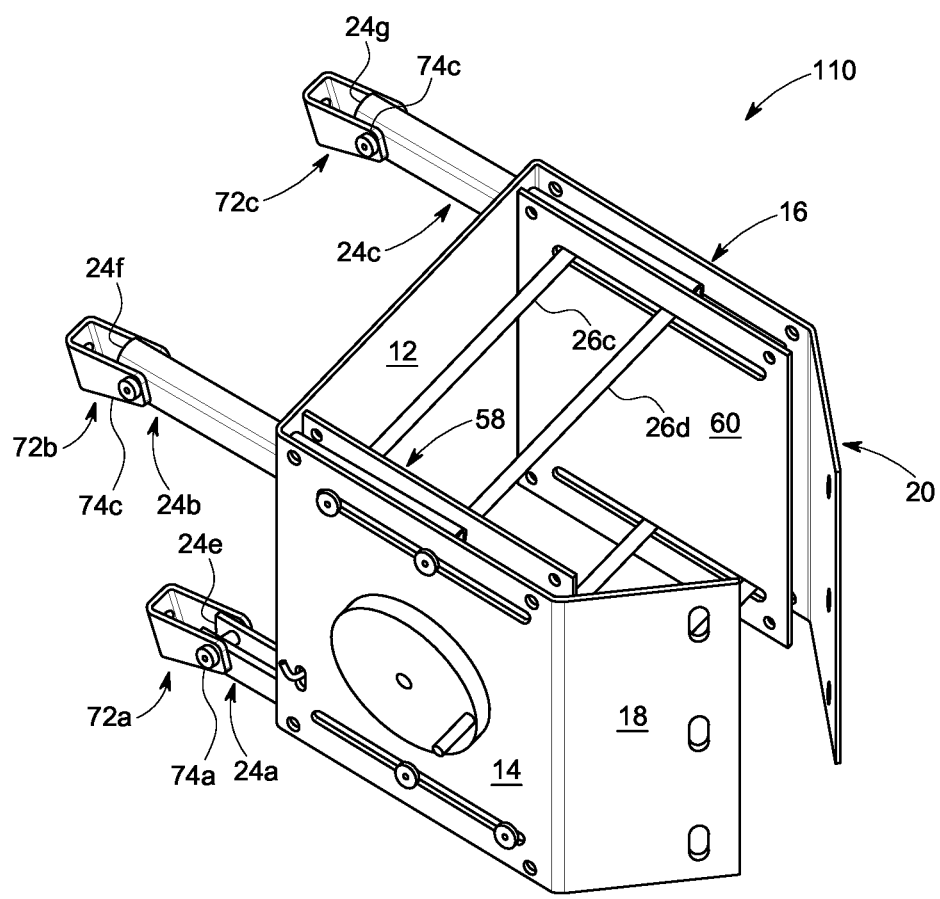
FIG. 4 is a top perspective view of a retainer assembly of FIG. 1 with a plurality of device brackets secured thereto, in accordance with one embodiment of the present disclosure.
Figure 5:
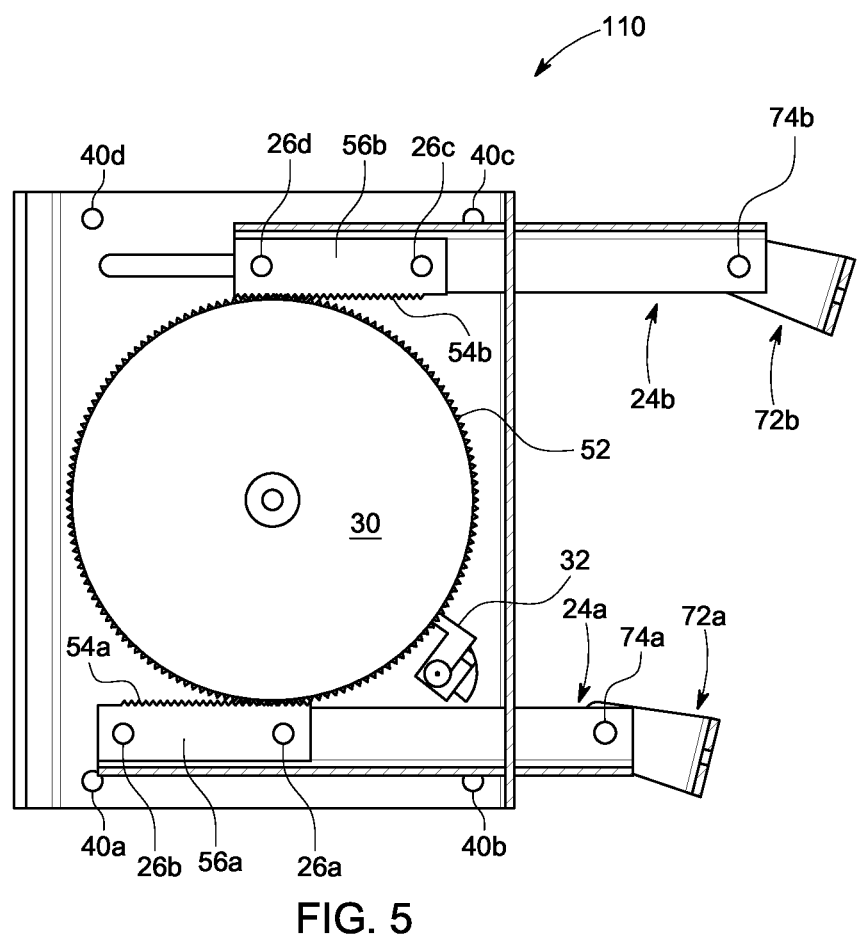
FIG. 5 is an interior view of the retainer assembly of FIG. 2 with a plurality of device brackets secured thereto, in accordance with one embodiment of the present disclosure.

Referring to FIGS. 4 and 5, a retainer assembly 110 is depicted that is identical to the retainer assembly 10 described above with respect to FIGS. 1 and 2, except that a plurality of device brackets has been added. As will be discussed below, the device brackets assist in properly securing the component in a desired angular position relative to the retainer assembly. Specifically, in FIG. 4, the retainer assembly 110 includes a plurality of device brackets 72a-72c. The other device bracket is hidden in the view of FIG. 4. Each one of the plurality of device brackets 72a-72c is detachably secured to a respective one of the first ends 24e-24g of the plurality of rack brackets 24a-24c via a respective fastener 74a-74c. The fastener may be a bolt or screw in one embodiment. It is contemplated that other fasteners may be used to secure the device brackets to the retainer assembly.

Figure 6:
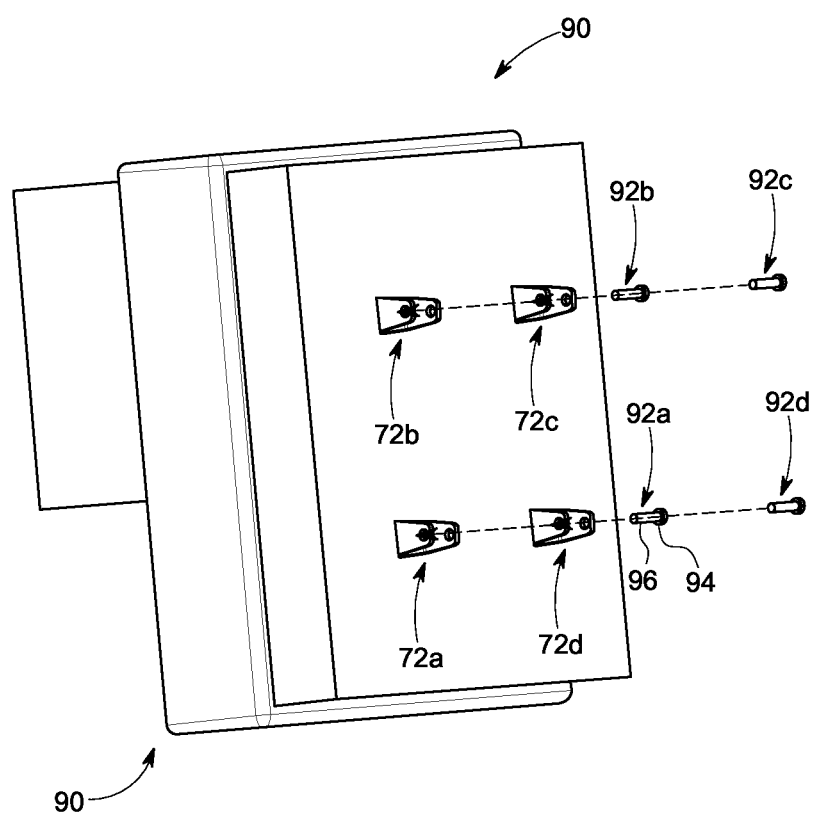
FIG. 6 is a side view of a component (an electronic device) including a plurality of device brackets in the process of being secured thereto, in accordance with one embodiment of the present disclosure.

FIG. 6 shows a non-limiting example of a component that can be secured to the retainer assembly 10. FIG. 6 is in the form of a component 90 (e.g., electronic device) with the plurality of device brackets 72a-72d being in the process of being secured by a respective fasteners 92a-92d. In one embodiment, the plurality of fasteners is a bolt. Each of the fasteners 92a-92d includes a head or face portion 94 and a body 96 of a reduced diameter. The body 96 includes a threaded portion in one embodiment. One non-limiting example of a bolt that may be used is a hex head bolt.

It is contemplated that other fasteners may be used such as a screw in other embodiments to secure the device brackets to the component. The fastener to be used in the present invention would include a head or face portion and a body with a reduced diameter. It is contemplated that the fastener may not have a threaded portion and in such an embodiment would be secured to a component (e.g., an electronic device) by another method. For example, the fastener may be secured to the component (e.g., electronic device) by, for example, welding.

Referring back to FIG. 3, the retainer assembly 10 is secured to the structure 150 via the plurality of apertures 70a-70f (see also FIG. 1) formed in the retainer assembly 10. The structure 150 in this embodiment is a pole. In one embodiment, the retainer assembly is secured to the structure by using at least one cable tie. The at least one cable tie extends through the plurality of apertures 70a-70f formed in the retainer assembly 10 and around the structure 150. The retainer assembly 10 is secured to the structure 150 by using a plurality of cable ties 152a-152c.

The cable ties may comprise one or more materials. For example, the cable ties comprise polymeric materials in one embodiment. In another example, the cable ties comprise metallic materials. One non-limiting metallic cable tie is a steel cable tie. A metallic cable tie may include a rubber or a plastic cover on at least a portion thereof so as to increase its friction with the structure (e.g., pole), and improve its corrosion resistance.

In FIG. 3, polymeric cable ties 152a-152c are used. It is contemplated that the cable ties may be of the same type or different types than shown in FIG. 7. It is contemplated that other fastening methods may be used such as clamps, screws and nuts to secure the retainer assembly to the structure.

Figure 7:
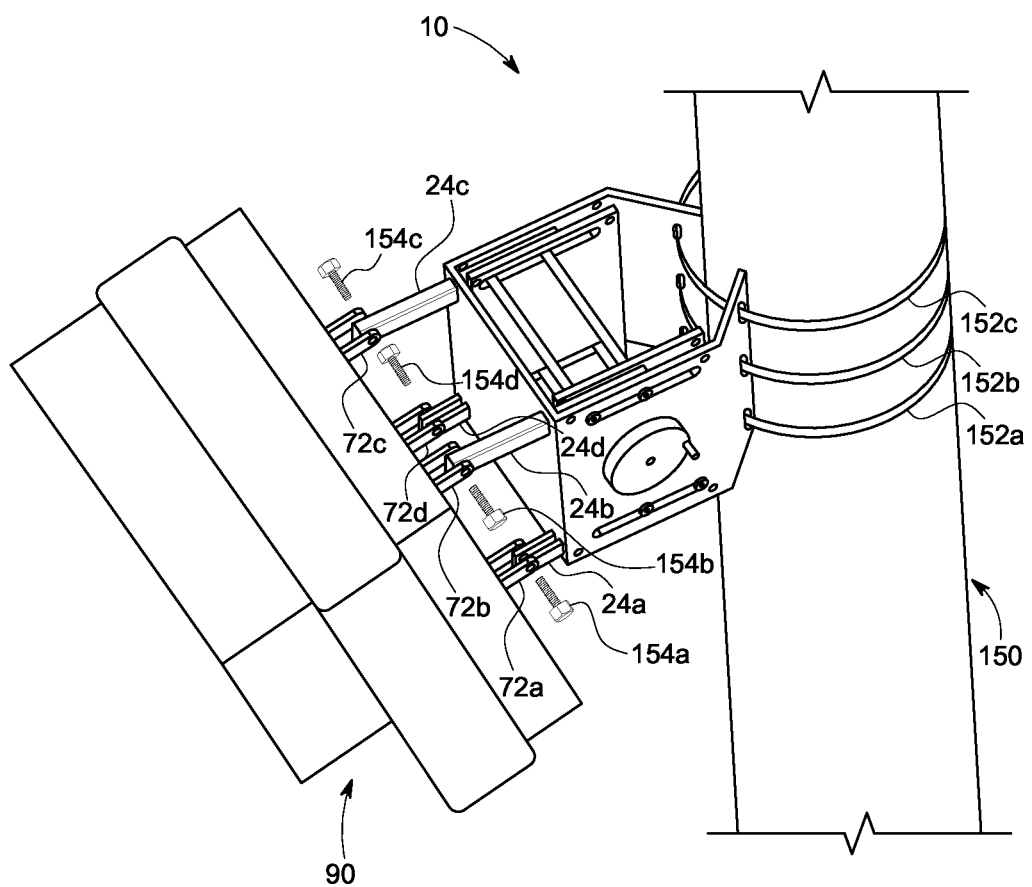
FIG. 7 is a top perspective view of the component of FIG. 6 in the process of being secured to the retainer assembly of FIG. 1 that has been previously secured to the structure of FIG. 3.

Referring to FIG. 7, the component 90 is shown as being in the process of being secured to the retainer assembly 10. In one method, this occurs after the retainer assembly 10 has been attached to the structure 150, and after the device brackets 72a-72d (FIG. 6) have been secured to the component 90. These process steps are shown in FIGS. 3 and 6, respectively. Referring back to FIG. 7, to initially connect or secure the component 90 to the retainer assembly 10, a plurality of fasteners 154a-154d is aligned with paired apertures formed in respective rack brackets 24a-24d, and paired apertures formed in the device brackets 72a-72d. The plurality of fasteners 154a-154b is in the form of bolts that initially secure the component 90 and the retainer assembly 10. During this step, the plurality of fasteners 154a-154d is installed in a pre-tightened position, establishing the component 90 at an initial angle relative to the retainer assembly 10. The fasteners 154a-154d are desirably pre-tightened to a position such that the component 90 will remain securely connected to the retainer assembly 10, but not tightened such that the relative angle cannot be readily modified between the component 90 and the retainer assembly 10.

Figure 8A:
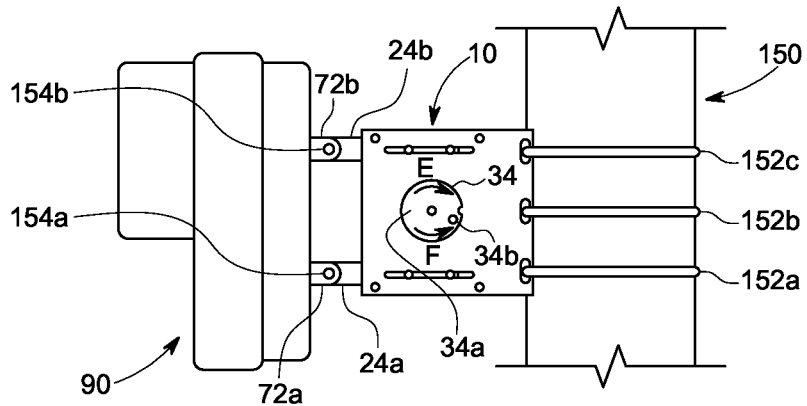
FIG. 8A is a side view of the component of FIG. 6, the retainer assembly of FIG. 1 and the structure of FIG. 3, in accordance with one embodiment of the present disclosure.
Figure 8B:
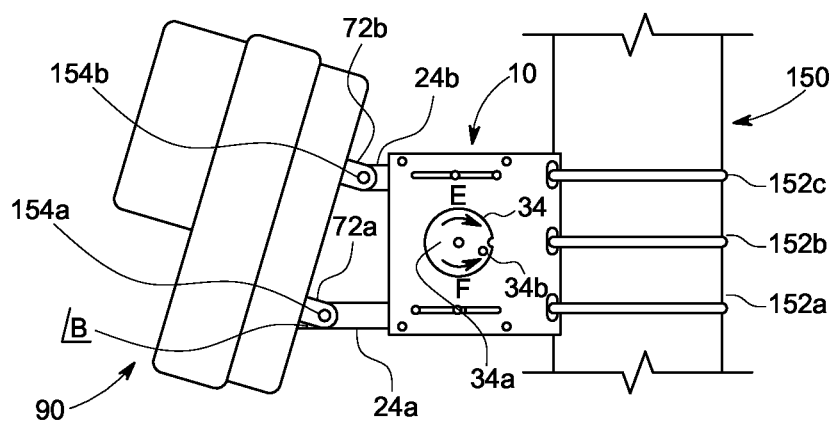
FIG. 8B is a side view of the component of FIG. 6, the retainer assembly of FIG. 1 and the structure of FIG. 3, in accordance with another embodiment of the present disclosure.
Figure 8C:
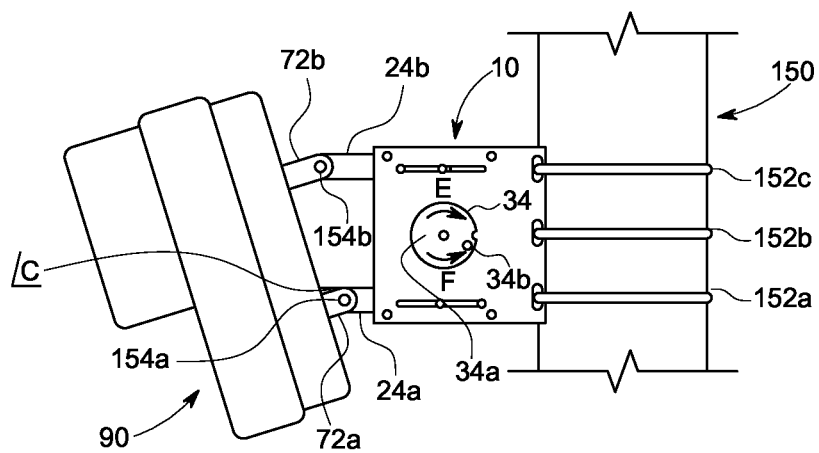
FIG. 8C is a side view of the component of FIG. 6, the retainer assembly of FIG. 1 and the structure of FIG. 3, in accordance with a further embodiment of the present disclosure.

Referring to FIGS. 8A-8C, a user can adjust the component 90 relative to the retainer assembly 10 after being pre-tightened, if desired. To adjust the component 90 relative to the retainer assembly 10 to a desired angle, a user grasps and moves the knob 34b of the rotating wheel 34a in a clockwise or counterclockwise direction. The functionality of the clockwise and counterclockwise movements (arrows E and F) of the user interface 34 is discussed in detail above with respect to the rack brackets 24a-24d.

After the component 90 and the retainer assembly 10 are in the final desired angle relative to each other, each of the plurality of fasteners 154a-154d (FIG. 7) is tightened to its final pressure. It is noted that the angle can be changed at a later time by loosening the fasteners 154a-154d, readjusting the angle of the component 90 relative to the retainer assembly 10, and tightening the fasteners 154a-154d to securely position the component 90 relative to the retainer assembly 10.

Referring back to FIGS. 8A-8C, the component 90 (e.g., an electronic device) is shown secured to the retainer assembly 10 via the plurality of device brackets 72a-72d (only brackets 72a, 72b are shown in FIGS. 8A-8C) at various angles. In FIG. 8A, the component 90 is attached and secured to the retainer assembly 10 at 0 degrees. It is noted that the rack brackets 24a-24d are about the same distance from the remainder of the retainer assembly 10. In FIG. 8B, the component 90 is attached and secured to the retainer assembly 10 at a positive 15 degrees. This is shown as angle B in FIG. 8B. It is noted that the rack brackets 24a, 24d are extended further from the remainder of the retainer assembly 10, as compared to the rack brackets 24b, 24c. In FIG. 8C, the component 90 is attached and secured to the retainer assembly 10 at a negative 15 degrees. This is shown as angle C in FIG. 8C. It is noted that the rack bracket 24b, 24c are extended further from the remainder of the retainer assembly 10, as compared to the rack brackets 24a, 24d.

It is contemplated that the angle of the component relative to the retainer assembly can vary from that shown in FIGS. 8A-8C. For example, the plurality of rack brackets and apertures may be longer in another embodiment. Such embodiments may be used when the electronic device is smaller and/or lighter. In such embodiments, the relative angle of the component to the retainer assembly can range from about a positive 80 degrees to about a negative 80 degrees.

The relative angle of the component to the retainer assembly can range from about a positive 45 degrees (see angle B in FIG. 8B) to about a negative 45 degrees (see angle C in FIG. 8C) in one embodiment. The relative angle of the component to the retainer assembly can range from about a positive 35 degrees to about a negative 35 degrees in another embodiment. The relative angle of the component to the retainer assembly can range from about a positive 30 degrees to about a negative 30 degrees in a further embodiment. The relative angle of the component to the retainer assembly can range from about a positive 25 degrees to about a negative 25 degrees in yet another embodiment. The relative angle of the component to the retainer assembly can range from about a positive 15 degrees to about a negative 15 degrees in yet a further embodiment.

It is contemplated that the order of the method may be formed sequentially, as described above. It is also contemplated that the steps of the method may be performed in a different order.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise.

Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A retainer assembly comprising:
    at least a front section, a first side and a second opposing side, the front section forming a plurality of apertures;
    a plurality of rack brackets, each of the plurality of rack brackets extending through a respective one of the plurality of apertures formed in the front section, each of the plurality of rack brackets having a first end;
    a plurality of rack pins, each of the plurality of rack pins extending across the first side to the second opposing side, each of the plurality of rack pins assisting in coordinated movement of the plurality of rack brackets;
    a gear located between and contacting two of the plurality of rack brackets, the gear being configured to laterally move two of the plurality of rack brackets;
    a latch being moveable from a first position to a second position to assist in preventing or inhibiting movement of the gear when the latch is in the second position; and
    a user interface configured to move the gear.

2. The retainer assembly of claim 1 further including a plurality of device brackets, each one of the plurality of device brackets being detachably secured to a respective one of the first ends of the plurality of rack brackets.

3. The retainer assembly of claim 1 further including an interior plate in which the gear is located between the first side and the interior plate, the interior plate forming a plurality of elongated slots, at least one of the plurality of rack pins extending through one of the plurality of elongated slots.

4. The retainer assembly of claim 1 further includes a plurality of interior plates, the plurality of interior plates being located between the first side and the second opposing side.

5. The retainer assembly of claim 1, wherein the retainer assembly further includes at least one back section generally opposite of the front section, the at least one back section forming a plurality of apertures configured to assist in attaching the retainer assembly to a structure.

6. The retainer assembly of claim 5, wherein the at least one back section of the retainer assembly is a plurality of back sections.

7. The retainer assembly of claim 1, wherein each of the first side and the second side includes at least one elongated slot, the at least one elongated slot of each of the first side and the second side being configured to allow at least one of the plurality of rack pins to extend therethrough.

8. The retainer assembly of claim 1, wherein the user interface is a rotating wheel with a knob for facilitating movement of the gear.

9. The retainer assembly of claim 1, wherein the shape of each of the plurality of rack brackets is a general U-shape.

10. A retainer assembly and an electronic device combination, the combination comprising:

a retainer assembly comprising: at least a front section, a first side and a second opposing side, the front section forming a plurality of apertures;

a plurality of rack brackets, each of the plurality of rack brackets extending through a respective one of the plurality of apertures formed in the front section, each of the plurality of rack brackets having a first end;

a plurality of rack pins, each of the plurality of rack pins extending across the first side to the second opposing side, each of the plurality of rack pins assisting in coordinated movement of the plurality of rack brackets;

a gear being located between and contacting two of the plurality of rack brackets, the gear being configured to laterally move two of the plurality of rack brackets;

a latch being moveable from a first position to a second position for preventing or inhibiting movement of the gear when the latch is in the second position;

a user interface configured to move the gear;

a plurality of device brackets, each one of the plurality of device brackets being detachably secured to a respective one of the plurality of the first ends of the plurality of rack brackets; and an electronic device being secured to the retainer assembly via the plurality of device brackets.

11. The combination of claim 10, wherein the angle of the electronic device relative to the retainer assembly is from about a positive 45 degrees to about a negative 45 degrees.

12. The combination of claim 11, wherein the angle of the electronic device relative to the retainer assembly is from about a positive 25 degrees to about a negative 25 degrees.

13. The combination of claim 12, wherein the angle of the electronic device relative to the retainer assembly is from about a positive 15 degrees to about a negative 15 degrees.

14. The combination of claim 10, wherein the retainer assembly further includes a plurality of interior plates, the plurality of interior plates being located between the first side and the second opposing side.

15. The combination of claim 10, wherein the retainer assembly further includes at least one back section generally opposite of the front section, the at least one back section forming a plurality of apertures configured to assist in attaching the retainer assembly to a structure.

16. The combination of claim 10, wherein the user interface is a rotating wheel with a knob for facilitating movement of the gear.

17. A method of assembling and securing a retainer assembly and a component to a structure, the method comprising:

providing the retainer assembly including at least a front section, a first side and a second opposing side, a plurality of rack brackets, a plurality of rack pins, a gear, a latch and a user interface, the front section forming a plurality of apertures, each of the plurality of rack brackets extending through a respective one of the plurality of apertures formed in the front section, each of the plurality of rack brackets having a first end, each of the plurality of rack pins extending across the first side to the second opposing side, each of the plurality of rack pins assisting in coordinated movement of the plurality of rack brackets, the gear being located between and contacting two of the plurality of rack brackets, the gear being configured to laterally move two of the plurality of rack brackets, the latch being moveable from a first position to a second position to assist in preventing or inhibiting movement of the gear when the latch is in the second position, and the user interface configured to move the gear;

securing the retainer assembly to a structure;

providing the component with a plurality of device brackets secured thereto;

securing the component to the retainer assembly via securing the plurality of device brackets to the plurality of rack brackets of the retainer assembly; and adjusting the component to a desired angle relative to the retainer assembly.

18. The method of claim 17, wherein the securing of the retainer assembly to the structure includes securing at least one cable tie through a plurality of apertures formed in the retainer assembly and around the structure.

19. The method of claim 17, wherein the component is an electronic device.

20. The method of claim 17, wherein the steps of securing the component to the retainer assembly via the plurality of device brackets to the plurality of rack brackets of the retainer assembly, and adjusting the component to a desired angle to the relative retainer assembly are performed in the absence of tools.

* * * * *